United States Patent [19]

Mack

[11] Patent Number: 4,726,719

[45] Date of Patent: Feb. 23, 1988

[54] DRILL CHUCK AND TOOL FOR ROTARY DRILLING AND ROTARY PERCUSSION DRILLING

[75] Inventor: Hans-Dieter Mack, Sontheim, Fed. Rep. of Germany

[73] Assignee: Rohm GmbH, Sontheim, Fed. Rep. of Germany

[21] Appl. No.: 841,556

[22] Filed: Mar. 20, 1986

[30] Foreign Application Priority Data

Mar. 20, 1985 [DE] Fed. Rep. of Germany ....... 3510068
Nov. 8, 1985 [DE] Fed. Rep. of Germany ....... 3539654

[51] Int. Cl.$^4$ ................................................ B23B 31/18
[52] U.S. Cl. .................... 408/240; 279/19.4; 279/64; 279/123
[58] Field of Search ................ 175/202, 203, 414; 279/19–19.7, 60–65, 66, 67, 76, 78, 123; 408/226, 238, 239 R, 239 A, 240; 82/40 R

[56] References Cited

U.S. PATENT DOCUMENTS

| 4,512,692 | 4/1985 | Nielsen | 279/19.5 |
| 4,536,109 | 8/1985 | Hunger et al. | 408/240 |
| 4,586,859 | 5/1986 | Rohm | 408/240 |

FOREIGN PATENT DOCUMENTS

| 3310146 | 10/1984 | Fed. Rep. of Germany. | |
| 3504917 | 8/1985 | Fed. Rep. of Germany | 279/19 |

*Primary Examiner*—Z. R. Bilinsky
*Attorney, Agent, or Firm*—Karl F. Ross; Herbert Dubno

[57] ABSTRACT

A drilling device includes a drill chuck which is provided with at least two adjustable clamping jaws slightly rotatably guided in the drill chuck and including a guide surface for a tool shank of a tool. The guide surface is provided with at least one projection extending in direction of the chuck axis and engaging into a recess of the tool shank for rotating and axially limiting the play of the tool. The projection of each jaw is arranged circumferentially rearwardly offset to the midplane of each clamping jaw so that the guide surface is defined by a leading part which is wider than a trailing part in circumferential direction of the tool shank.

18 Claims, 6 Drawing Figures

DRILL CHUCK AND TOOL FOR ROTARY DRILLING AND ROTARY PERCUSSION DRILLING

CROSS REFERENCE TO RELATED APPLICATION

This application is related to the commonly owned copending application Ser. Nos. 839,421, 839,422, and 839,789 and the following additional applications:

| Ser. No. | Filing Date |
|---|---|
| 808,894 | 13 December 1985 |
| 808,891 | 13 December 1985 |
| 808,893 | 13 December 1985 |
| 788,775 | 18 October 1985 |
| 744,795 | 13 June 1985 |
| 702,049 | 15 February 1985 |
| 702,053 | 15 February 1985 |
| 686,243 | 26 December 1984 |
| 743,583 | 11 June 1985 |
| 658,133 | 5 October 1984 |
| 726,596 | 23 April 1985 |
| 726,587 | 23 April 1985 |
| 731,655 | 7 May 1985 |
| 719,760 | 4 April 1985 |
| 720,259 | 5 April 1985 |
| 703,888 | 21 February 1985 |
| 654,792 | 26 September 1984 |
| 654,791 | 26 September 1984 |
| 591,975 | 21 March 1984 | and the applications referred to therein.

FIELD OF THE INVENTION

My present invention refers to a drill chuck and a tool for rotary drilling and/or rotary percussion (hammer) drilling. More particularly, the invention relates to a chuck jaw and tool arrangements for rotary and hammer drills.

BACKGROUND OF THE INVENTION

The German patent publication DE-OS No. 33 10 146 describes a drill chuck having radially adjustable clamping jaws which are provided with central projections arranged symmetrical to the mid-plane or axial median plane of each jaw and engaging in cooperating recesses of a tool shank. For centering and guiding the tool shank, the jaws are provided with opposing guide surfaces of equal width at both sides of the projections in circumferential direction and axial direction. In the circumferential direction, the guide surface is of concave shape so that an exact engagement with the cylindrical surface shell of the tool shank is obtained only when the shank radius corresponds to the radius of curvature of the guide surface. It is only in this case that the guide surface provides the desired guidance and centering of the tool (i.e. the drill bit) while the projections ensure the rotation thereof.

When the shank radius is smaller than the radius of curvature of the guide surface, the rotation of the tool and its guidance can be achieved solely by the projections, resulting in considerable deterioration of the guidance and centering of the tool in the drill chuck. Alternatively, the clamping jaws, which are slightly rotatable about their guide axis within the support in the drill chuck, are rotated in the support by the torque which is exerted from the tool shank via the projections engaging into the recesses of the tool shank until the leading part of the guide surface preceding the projection in direction of rotation of the drill chuck contacts with its forward edge the surface of the tool shank along a line so that considerable contact forces are obtained leading to high friction between the tool shank and the edge. Such high friction results in considerable wear of the clamping jaws and the tool and can lead to jamming of the tool shank in the jaws thereby impairing the axial mobility of the tool in the drill chuck and considerably reducing any hammer drilling action.

OBJECT OF THE INVENTION

It is thus the principal object of my present invention to provide an improved drill chuck with a matching tool obviating the afore-stated drawbacks.

Another object of the invention is to provide a jaw and tool assembly for a drill chuck of the aforedescribed type such that the assembly can accommodate itself automatically to different shank diameters and will retain a wide range of tool bit shaft sizes equally well.

SUMMARY OF THE INVENTION

I realize this object, in accordance with the present invention, by providing a drill chuck provided with at least two clamping jaws each of which defines for a tool shank a guide surface which is provided with at least one projection extending towards the axis of the drill chuck and engageable within a respective recess of the tool shank wherein the projection of each jaw extends circumferentially offset with respect to the mid-plane of the jaw so that in rotational direction of the drill chuck the guide surface is defined by a leading part and a trailing part in such a manner that in circumferential direction of the tool shank the leading part is circumferential longer than the trailing part.

Through the provisions of a rearwardly offset projection of each clamping jaw with respect to the rotational direction of the tool, an increased distance between the engagement of the projection in the recess on the one hand the engagement of the forward jaw edge on the surface shell of the tool shank on the other hand is obtained so that the contact force between the forward jaw edge and the tool shank is decreased.

Consequently, the guidance of the tool is improved and jamming of the tool within the drill chuck as well as wear at the jaws and at the tool shank are considerably reduced. The slight rotation of the clamping jaws in their support within the drill chuck is utilized to provide favorable support and guiding conditions for the tool within the drill chuck for a wide range of diameters of the tool shank.

According to the teaching of the present invention, the circumferentially offset the projection of each jaw is such that the leading part of the guide surface has a circumferentially longer at least twice the length of its trailing part.

In general, the trailing part can be dimensioned with comparatively narrow dimensions as its use is limited for guiding the tool shaft during reverse run of the drill chucks during which the transmission of torque between tool and jaws is minor and high contact forces between tool shank and rear guide surface do not occur. This means that in the event the reverse run of the drill chuck and of the tool is of no concern, the trailing part can completely be omitted so that the projection is directly connected to the trailing edge of the jaws in rotational direction of the drill chuck.

In this case, it is preferred to provide the leading part in step-shaped manner so as to define two adjacent surface areas, that is an inner area which directly leads from the projection and a forward area having a distance to the chuck axis exceeding the distance of the inner area thereto. When using tools with shanks of relatively large diameter, the so-formed step-shaped guide surface assumes the guidance and support of the tool shank while in tools with smaller shank diameter, it is sufficient to have only the inner area to provide the guidance of the shank.

According to another feature of the invention, except for a narrow area adjacent the projection, the guide surface extends radially within or at least in the circular cylindrical envelope surface extending coaxial with the chuck and corresponding to the maximal clamping diameter when this envelope circle cuts in circumferential direction the forward and backward edge of the guide surface.

This means that even in those drill chucks in which the projection of each jaw is convex towards the chuck axis and the guide surface is concave along a circular arc, the radius of curvature of the guide surface always exceeds or corresponds at least to the shank diameter of each tool shank usable within the drill chuck, and the engagement of the clamping jaws with the guide surface at the tool shank through rotation of the jaws within the chuck is obtained up to the largest clamping diameter. Preferably, the edge of the leading part of the guide surface is rounded to a convex shape so as to avoid the presence of sharp edges which could jam the shank and quickly wear down.

According to another feature of the invention, the leading part of the guide surface is defined by a planar surface extending within the envelope circle and forming a secant. This embodiment of the drill chuck is especially advantageous as the tool shank can also be provided with matching planar centering surfaces which engage the guide surface during rotation of the jaws and extend within the envelope circle of the tool shank at any diameter thus allowing simple manufacture thereof. The presence of a narrow area projecting radially outwardly beyond the envelope circle is irrelevant as the concerned material can be provided directly from the recesses when the latter are made by material deformation and coining or compression instead of cutting.

DESCRIPTION OF THE DRAWING

The above and other objects, features and advantages of my present invention will become more readily apparent from the following description, reference being made to the accompanying highly diagrammatic drawing in which.

SPECIFIC DESCRIPTION

Figure 1:
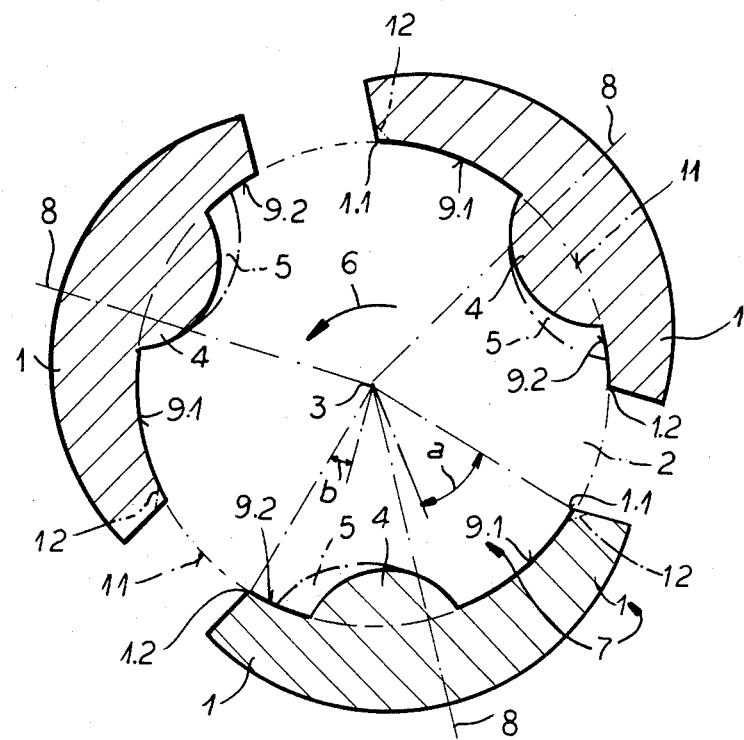
FIG. 1 is a schematic cross sectional view through only the jaw array and bit assembly of a first embodiment of a drill chuck according to the invention corresponding to the section line A—A in FIG. 6.

FIGS. 1-5 show various jaw arrays and the drill bit engaged thereby. All of these jaw arrays can be provided in one of the chucks illustrated and described in one of the aforementioned copending applications. However a simpler chuck into which these arrays can be built has been shown in FIG. 6.

Here a rotary impact drill chuck 100 is connected by its spindle and body 112 to an electric motor 101 of the drill which transmits axial impacts to a rod 115 traversing the spindle and chuck body 112 to the end of the drill bit.

A sleeve 102 is threaded onto the body 112 and has a frustoconical end 111 whose internal surface 110 engages the inwardly and forwardly inclined outer surfaces of the chuck jaws 107 as shown at 109 to cam them radially inwardly upon rotation of the sleeve 102 to tighten the chuck. The jaws 107, of which only one has been shown, are radially guided on the surfaces 113 of the body 112.

The tool 103 has recesses or pockets 106 engaged by projections 108 of the jaws, the pockets having flanks 104, 105 limiting axial displacement of the bit relative to the jaws.

The jaw arrays and their relationship to the tools can correspond to any of those illustrated in FIGS. 1-5.

Figure 2:
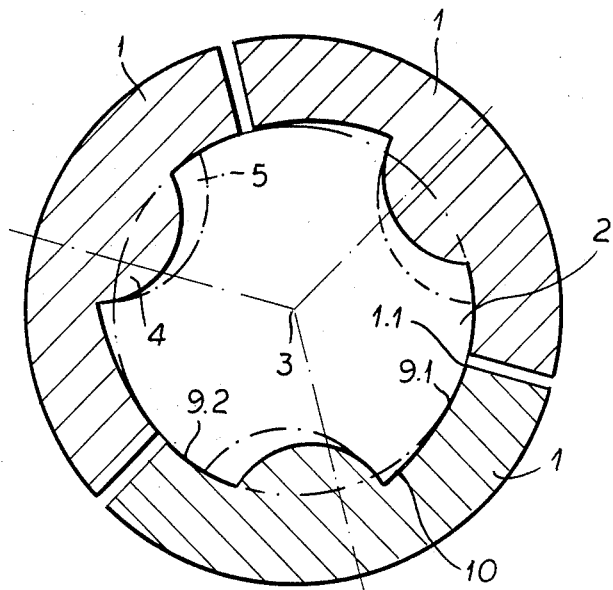
FIG. 2 is a schematic cross sectional view through only the jaw array and bit assembly of a drill chuck according to FIG. 1 with a tool shank of smaller diameter corresponding to the section line A—A in FIG. 6.

Referring now to FIGS. 1 and 2, there is shown a jaw arrangement for a drill chuck for rotary drilling and rotary percussion drilling with a tool. The jaw arrangement for the drill chuck includes three uniformly spaced clamping jaws 1 which are centrally adjustable with respect to the chuck axis 3 to engage the tool shank 2 of the otherwise not shown tool. In FIG. 1, a tool shank 2 is shown of largest possible diameter while FIG. 2 illustrates a tool shank 2 of smallest possible diameter.

Each clamping jaw 1 is provided with a projection 4 of the convex shape towards the chuck axis 3 and dividing the concave guide surface for the surface shell of the tool shank 2 into a leading part 9.1 and a trailing part 9.2 when viewed in the rotational direction of the drill chuck as indicated by arrow 6. Each projection 4 of the jaws 1 is engageable in a recess 5 of the tool shank 2 so as to transmit the rotational movement of the jaws 1 to the tool. Although not shown in FIGS. 1 and 2, at least one of the recesses 5 is closed at its axial end of the shank 2 to provide an abutment for the respective projection 4 in order to prevent a disengagement of the tool in an axial direction by dropping out of the drill chuck (see FIG. 6).

The torque to be transmitted between the jaws 1 and the tool shank 2 also results in a torque at the jaws which are thus forced to rotate in their respective guides within the drill chuck according to double arrow 7 as indicated in FIG. 1. As shown in FIG. 2 which illustrates a drill chuck clamping a tool shank 2 of smaller diameter, the leading edge 1.1 of the leading guide surface 9.1 is rotated radially inwardly while the trailing edge 1.2 of the trailing part 9.2 is rotated radially outwardly.

Reference numeral 8 designates the mid-plane of each jaw 1 through the chuck axis 3, and it can be seen that each projection 4 is arranged circumferentially rearwardly offset to the mid-plane so that in circumferential direction of the tool shank 2, the leading part 9.1 of the guide surface has a circumferential length a exceeding the circumferential length b of the trailing part 9.2.

Preferably, the length of the leading part 9.1 is at least twice the length b of the trailing part 9.2. Except for a narrow area 10 existing in circumferential direction in immediate proximity to each projection, the guide surfaces 9.1, 9.2 extend radially within or at least coincides with a circular cylindrical envelope surface 11 which is coaxial with the drill chuck axis and corresponds to the largest clamping diameter.

In FIG. 1, the envelope surface 11 corresponds with the surface shell of the tool shank 2 as it cuts the leading edge 1.1 and trailing edge 1.2 of the guide surfaces 9.1, 9.2.

In the embodiment as shown in FIGS. 1 and 2, the torsion of the clamping jaws 1 allows the engagement of their leading edges 1.1 in the direction of rotation on the surface shell of the tool shank 2 so that its guidance and centering within the drill chuck with smaller diameters is considerably improved in comparison to those prior art proposals in which guidance and centering is obtained solely by the projections engaging into the recesses 5.

As indicated by broken line 12 in FIG. 1, the leading edge 1.1 of the leading part 9.1 may also be convexly rounded so as to avoid sharp edges which are especially susceptible to wear.

Figure 3:
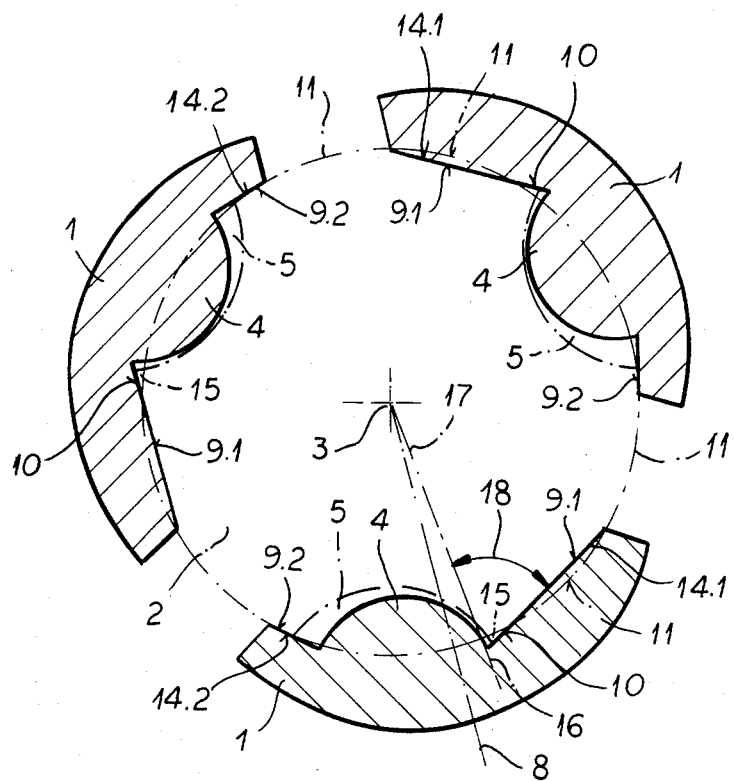
FIG. 3 is a schematic cross sectional view through only the jaw array and bit assembly of a second embodiment of a drill chuck according to the invention corresponding to the section line A—A in FIG. 6.

FIG. 3 shows a second embodiment of a drill chuck according to the invention, the only difference to the embodiment of FIGS. 1 and 2 residing in the shape of the guide surfaces 9.1, 9.2. As already described, the drill chuck according to the first embodiment has the leading part 9.1 and trailing part 9.2 of concave shape along a circular arc. In the embodiment of FIGS. 3, the leading part 9.1 and the trailing part 9.2 of the guide surface are each defined by a planar forming a secant within the envelope surface 11 except for the narrow areas 10.

In this embodiment as well as in the embodiment subsequently described with respect to FIG. 4, the envelope surface 11 does not necessarily have to correspond with the surface shell of the largest clamping diameter of the tool shank 2.

Figure 4:
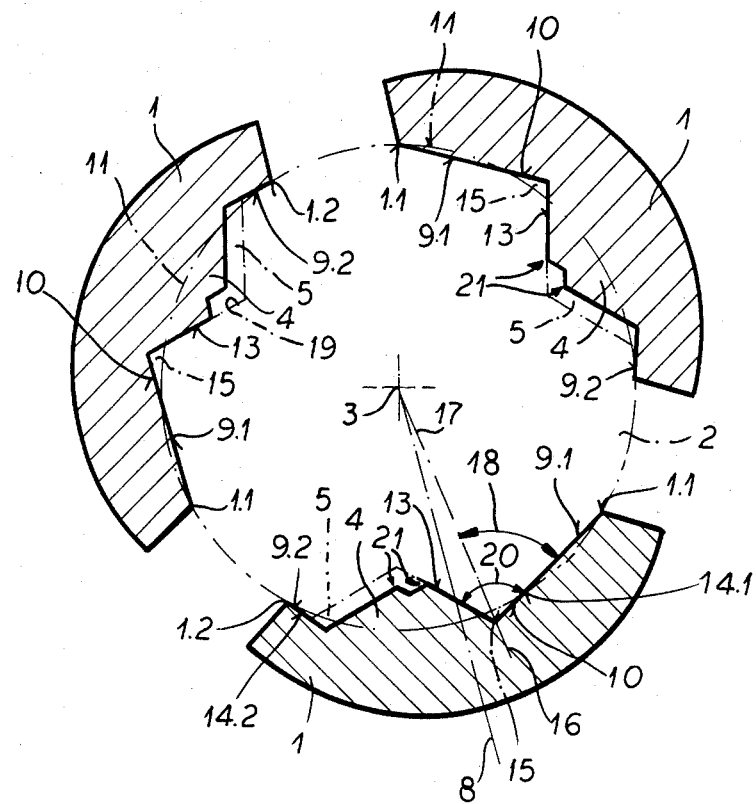
FIG. 4 is a schematic cross sectional view through only the jaw array and bit assembly of a third embodiment of a drill chuck according to the invention corresponding to the section line A—A in FIG. 6.

The drill chuck according to FIG. 4 corresponds essentially to the drill chuck of FIG. 3 except that the projection 4 of each jaw 1 is not of convex shape but rather includes a planar engaging surface 13 which forms with the leading guide surface 9.1 a fixed angle 20 and extends parallel to the trailing guide surface 9.2 which is thus also of planar shape. Each recess 5 is provided in correspondence to the planar surfaces of the cooperating projection 4 also with planar surfaces in the form of a triangle so that the guide surfaces 9.1, 9.2 and engaging surface 13 of each jaw 1, due to the rotatability of the jaws, contact over a large area the respective planar surfaces of the tool shank 2 regardless of its diameter. This results in a highly precise and yet smooth guidance and rotation of the tool shank 2 by the jaws 1.

Since the guide surfaces 9.1, 9.2 extend radially within the envelope circle 11, the centering surfaces 14.1, 14.2 of the tool shank 2 as illustrated in the embodiments of FIGS. 3 and 4 respectively lie on the guide surfaces 9.1, 9.2 and extend also within their envelope circle 11 so that their production can easily be obtained through material reduction. The radially projecting portion of material as indicated by reference numeral 15 in the areas 10 of the leading guide surface 9.1 and possibly of trailing guide surface 9.2 is of no concern as the required material accumulation is provided by the tool shaft 2 through pushing material out of the recesses 5.

As shown in FIGS. 3 and 4, the plane centering surface 14.1 of the tool shank 2 describes with the diameter plane 17 which extends through the chuck axis 3 and the edge 16 as defined at each jaw 1 at the junction between the recess 5 and the respective centering surface 14.1 an angle 18 which remains constant and is independent of the diameter of the envelope circle 11. The angle 18 essentially corresponds also to the angle as defined between the guide surface 9.1 and the diameter plane 17.

Each recess 5 in the tool shaft 2 is defined by a planar stop surface 19 which forms with the centering surface 14.1 a fixed angle 20 corresponding to the angle as defined between the guiding surface 9.1 and the engaging surface 13 of each jaw 1 and independent of the diameter of the envelope circle 11 of the tool shank 2. The trailing centering surface 14.2 extending behind each recess 5 within the envelope circle 11 defines with the leading centering surface 14.1 an angle which is also independent of the diameter of the envelope circle 11 and corresponds to the angle between the guide surfaces 9.1 and 9.2 of the clamping jaws 1. The stop surface 19 of each recess 5 in the tool shank 2 extends parallel to the centering surface 14.2.

In the embodiment of the drill chuck in accordance with FIG. 4, the projections 4 are also provided with chucking cutters 21 for clamping tools having a cylindrical grooveless shank.

The slight torsion of the jaws 1 within the drill chuck allows the guide surfaces 9.1, 9.2 and the engaging surface 13 to engage flatly the respective centering surfaces 14.1, 14.2 and the stop surface 19 at the tool shank 2 so that along these adjacent surfaces local strains caused by forces are minor thereby allowing a reliable and smooth guidance and centering of the tool shank 2 by the jaws 1 in view of the low surface pressure. Wear at the tool shank 2 and the jaw is essentially prevented.

Although in the embodiments as shown in FIG. 3 and 4, the guide surfaces 9.1, 9.2 and centering surfaces 14.1, 14.2, and in addition in FIG. 4 the engaging surface 13 as well as stop surface 19 are of planar shape, it should be noted that any other profile is certainly possible as long as the cooperating surfaces are of corresponding design and allow a flat contact independent of the diameter of the shank 2.

It is this flat contact which causes a considerable reduction of locally occurring forces exerted on the surfaces so that the strain at the guide surfaces and centering surfaces is diminished.

Figure 5:
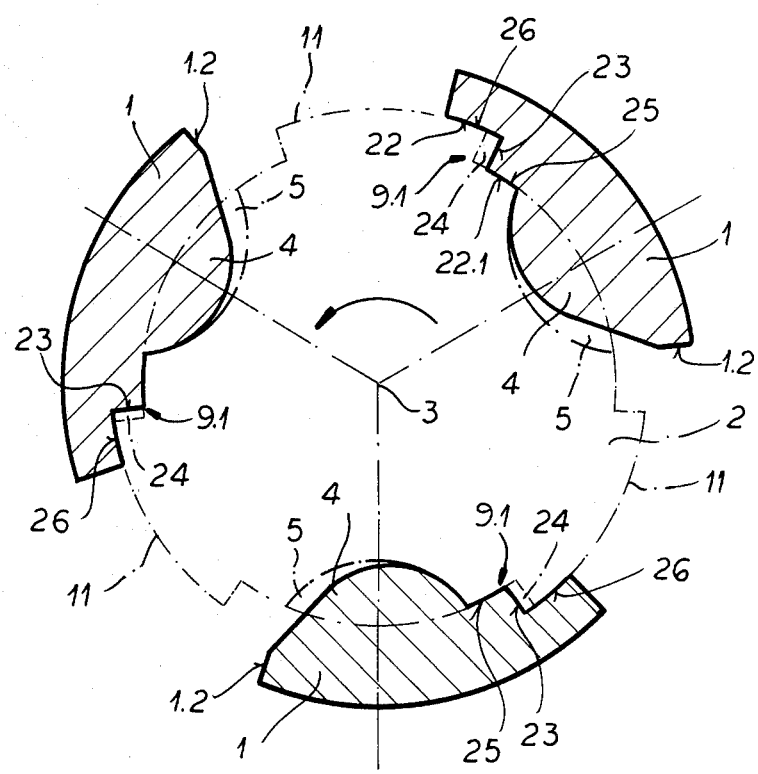
FIG. 5 is a schematic cross sectional view through only the jaw array and bit assembly of a fourth embodiment of a drill chuck according to the invention corresponding to the section line A—A in FIG. 6.
Figure 6:
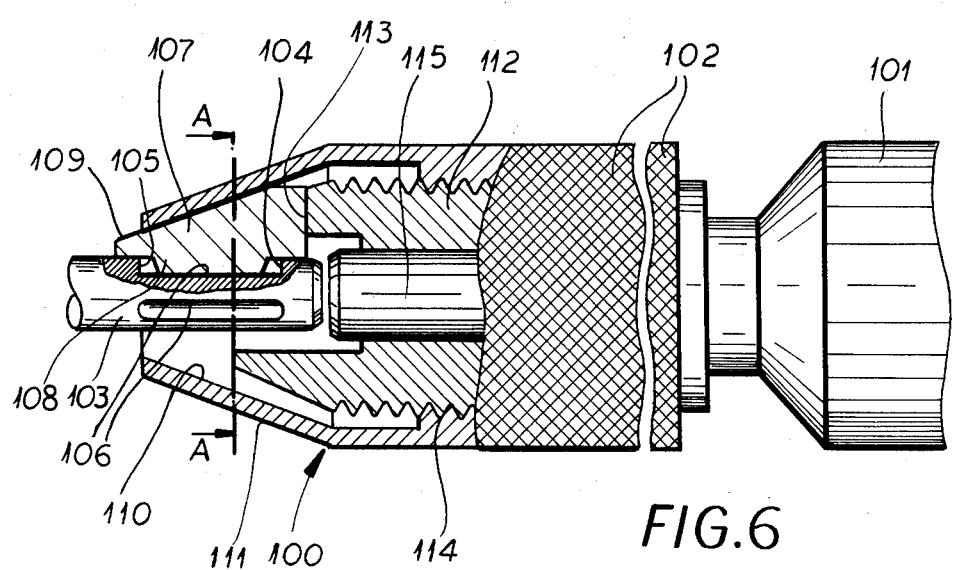
FIG. 6 is an axial section through a chuck.

Turning now to FIG. 5, there is shown a further embodiment of a drill chuck according to the invention in which the guiding surface of each jaw 1 is essentially defined by the leading part 9.1 without any trailing part 9.2 so that the projection 4 of each jaw 1 directly ends at the edge 1.2 trailing in direction of rotation of the drill chuck. The leading guide surface 9.1 of each jaw 4 is step-shaped as indicated by reference numeral 23 so as to define an inner surface area 22.1 which directly precedes the projection 4 and has a smaller distance from the chuck axis 3 than the forward surface area 22.2.

The tool shank 2 is provided with three uniformly spaced depressions 24 extending within the envelope circle 11 at a depth corresponding to the step 23 and arranged in direction of rotation before each recess 5. The base 25 of each depression 24 is engageable with the inner surface area 22.1 of the respective clamping jaw 1.

The surface shell of the tool shank 2 which extends before each depression 24 within the envelope circle 11 and is indicated by reference numeral 26 supports the front surface area 22.2 of each jaw 1 so that the entire guide surface 9.1 is supported by the tool shank 2. This, however, may not necessarily be the case in shanks 2 of smaller diameters; rather, the depressions 24 can be omitted so that the front surface area 22.2 is not supported but only the inner surface area 22.1 along which the surface shell of the tool shank 2 lies within the envelope circle except for the recesses 5.

I claim:

1. A drilling device for rotary drilling and rotary percussion drilling, comprising:
   a drill chuck having a central axis and having at least two adjustable clamping jaws, each clamping jaw being rotatable to a limited degree within guidance constraints and a respective mid-plane extending through said axis and a respective point lying in a circumferfnetial location of each jaw whereby two portions of equal circumferential length on each jaw are located on either side of said respective point; and
   a tool in said chuck having a tool shank provided with at least one recess, each of said clamping jaws defining for said tool shank a guide surface which is provided with at least one projection extending towards said axis and engageable within said recess for rotating and axial play limitation of said tool, said projection extending circumferentially offset with respect to said mid-plane so that said guide surface is defined in a rotational direction of the drill chuck by a leading part and a trailing part in such a manner that in a circumferential direction of said tool shank said leading part is circumferentially longer than said trailing part.

2. A drilling device as defined in claim 1 wherein said leading part of said guide surface has a circumferential length which is at least twice the circumferential length of said trailing part.

3. A drilling device as defined in claim 1 wherein said trailing part is of negligible circumferneital length so that each of said clamping jaws defines a trailing edge in the rotational direction of said drill chuck, said projection being directly connected to said trailing edge.

4. A drilling device as defined in claim 1 wherein said leading and trailing parts of said guide surface of each clamping jaw define a respective leading edge and a trailing edge in circumferential direction, said drill chuck defining a maximum clamping diameter corresponding to a circular-cylindrical envelope surface coaxial with said drill chuck, said guide surface essentially extending radially inwardly within or at least in said envelope surface when the latter intersects said leading and trailing edges of said guide surface.

5. A drilling device as defined in claim 4 wherein said projection is of convex shape towards said axis.

6. A drilling device as defined in claim 4 wherein said guide surface is of concave shape in direction of a circular arc.

7. A drilling device as defined in claim 5 wherein said leading edge of said leading part is rounded in convex shape in cross section.

8. A drilling device as defined in claim 4 wherein said leading part of said guide surface is defined by a planar surface forming a secant extending within said envelope surface.

9. A drilling device as defined in claim 8 wherein said projection includes a planar engaging surface connected to said leading part of said guide surface.

10. A drilling device as defined in claim 3 wherein said leading part is step-shaped so as to be defined by an inner area directly connected to said projection and having a distance to said axis, and a forward area having a distance to said axis exceeding said distance of said inner area to said axis.

11. A drilling device as defined in claim 4 wherein said trailing part of said guide surface is planar.

12. A drilling device as defined in claim 9 wherein said engaging surface extends essentially parallel to said trailing part of said guide surface.

13. A drilling device as defined in claim 10 wherein said tool shank defines an envelope circle and is provided with a surface shell essentially corresponding to said envelope circle, said tool shank including a depression extending within said envelope circle before each recess in rotational direction and having a base along which said inner area of said step-shaped leading part extends while said forward area lies on said surface shell.

14. A drilling device as defined in claim 9 wherein said tool shank defines an envelope circle with a diameter and includes a first planar centering surface cooperating with said leading part and arranged within said envelope circle before each recess in rotational direction, said centering surface defining at a junction with said recess an edge wherein said tool shank defines a diameter plane extending through said axis and said edge and describing with said centering surface a constant angle which is independent of said diameter of said envelope surface.

15. A drilling device as defined in claim 14 wherein said recess of said tool shank is defined by a planar stop surface which describes independent of said diameter of said envelope circle with said centering surface a fixed angle which corresponds to the angle as defined between said leading part and said planar engaging surface.

16. A drilling device as defined in claim 14 wherein said tool shank is provided with a second planar centering surface cooperating with said trailing part and arranged within said envelope circle behind each recess, said second centering surface defining with said first centering surface an angle independent of said envelope circle and corresponding to the angle between said leading and trailing parts of said guide surface.

17. A drilling device as defined in claim 15 wherein said tool shank is provided with a second planar centering surface cooperating with said trailing part and arranged within said envelope circle behind each recess, said second centering surface extending essentially parallel to said stop surface.

18. A drill chuck for a tool for rotary drilling and rotary percussion drilling having a central chuck axis, comprising: at least two adjustable clamping jaws rotatable to a limited degree in their support, each of said clamping jaws having a mid-plane extending through the central chuck axis and through a point which lies in a circumfernetial location of the jaw in which two portions of each circumferential length on said jaw are located on either side of said point, said clamping jaws being provided with a guide surface which includes at least one projection engageable within a recess of a tool for rotating and axial play limitation thereof, said projection extending circumferential offset with respect to said mid-plane so that said guide surface is defined in rotational direction of the drill chuck by a leading part and a trailing part in such a manner that in circumferential direction of the tool said leading part is circumferentially longer than said trailing part.

* * * * *